United States Patent [19]
Fiedler

[11] 3,948,220
[45] Apr. 6, 1976

[54] BIRD FEEDING STATION

[76] Inventor: Kenneth L. Fiedler, 150 Graham St., Austin, Minn. 55912

[22] Filed: Aug. 26, 1974

[21] Appl. No.: 500,717

[52] U.S. Cl.............................................. 119/51 R
[51] Int. Cl.².......................................... A01K 39/00
[58] Field of Search.................... 119/51 R, 52 R

[56] References Cited
UNITED STATES PATENTS

| | | | |
|---|---|---|---|
| 1,891,042 | 12/1932 | Benoit............................. | 119/52 R |
| 3,244,150 | 4/1966 | Blair................................ | 119/52 R |
| 3,399,650 | 9/1968 | Goodman....................... | 119/51 R |
| 3,788,279 | 1/1974 | Boehland, Jr................. | 119/52 R |

Primary Examiner—Hugh R. Chamblee
Attorney, Agent, or Firm—Williamson, Bains & Moore

[57] ABSTRACT

A spherical bird feeding station for dispensing food to birds comprises upper and lower mating hemispheres having a hollow interior chamber for storage of food, the lower hemisphere having a plurality of perforations thereabout through which birds may extract the food stored within while clinging to an encircling perch ring fixed to the lower hemisphere. An elongated rod extends along the polar axis of the sphere, supporting and carrying the lower hemisphere and extending upwardly through the pole of the upper hemisphere, which is slideably mounted on the rod for vertical sliding movement therealong from a closed position, wherein the upper hemisphere engages the lower hemisphere to form the spherical station, and a loading position, wherein the upper hemisphere is spaced along the rod from the lower hemisphere. The rod has an eyelet at its upper end for attachment to a support and to provide a stop to keep the upper hemisphere on the rod. The elongated rod passes loosely through the poles of the upper and lower hemispheres to permit tilting of both hemispheres relative to the rod to thereby permit the upper hemisphere to be swung laterally to increase the size of the opening between the hemispheres to facilitate insertion of food within the chamber.

4 Claims, 3 Drawing Figures

U.S. Patent  April 6, 1976  3,948,220
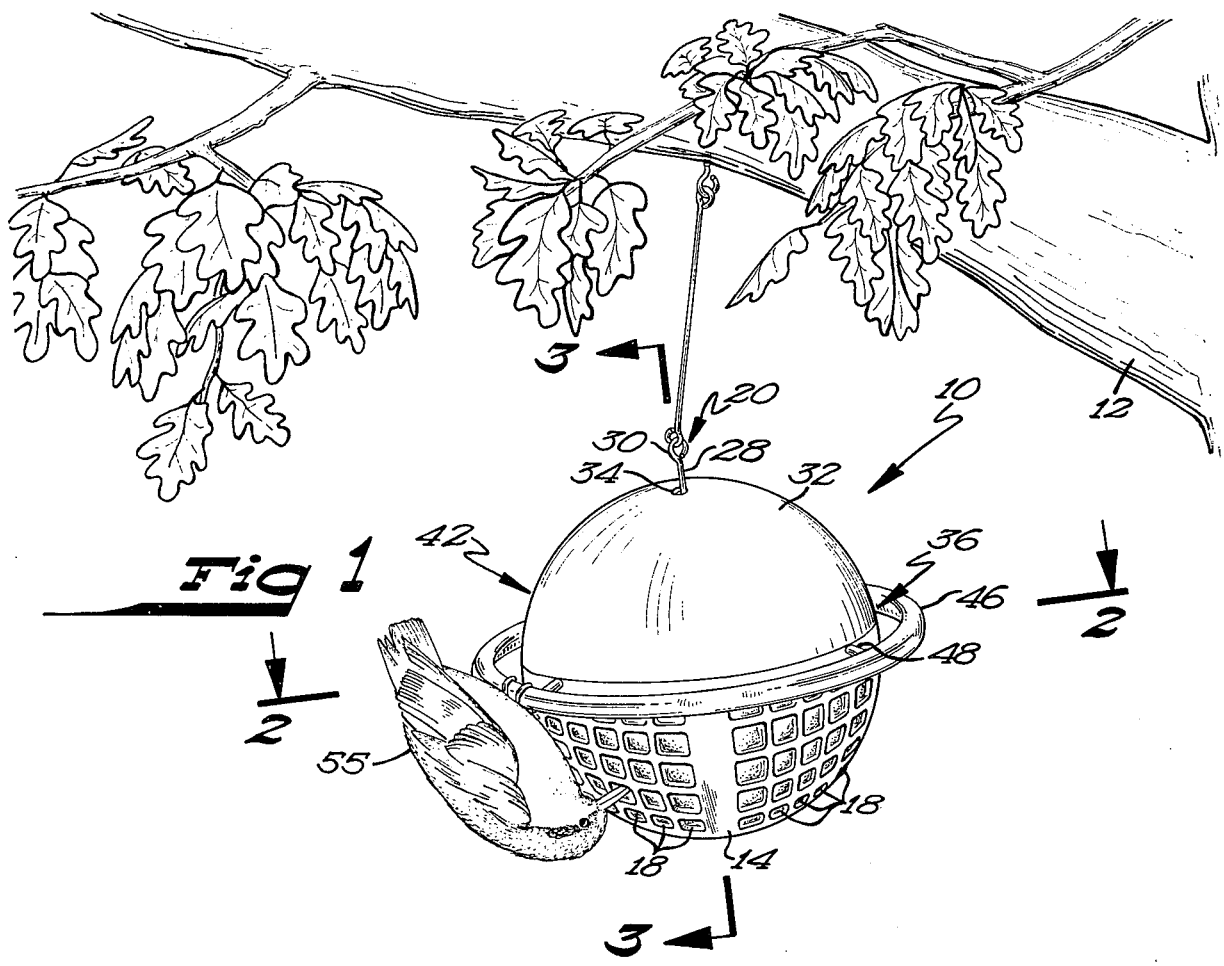
Fig 1
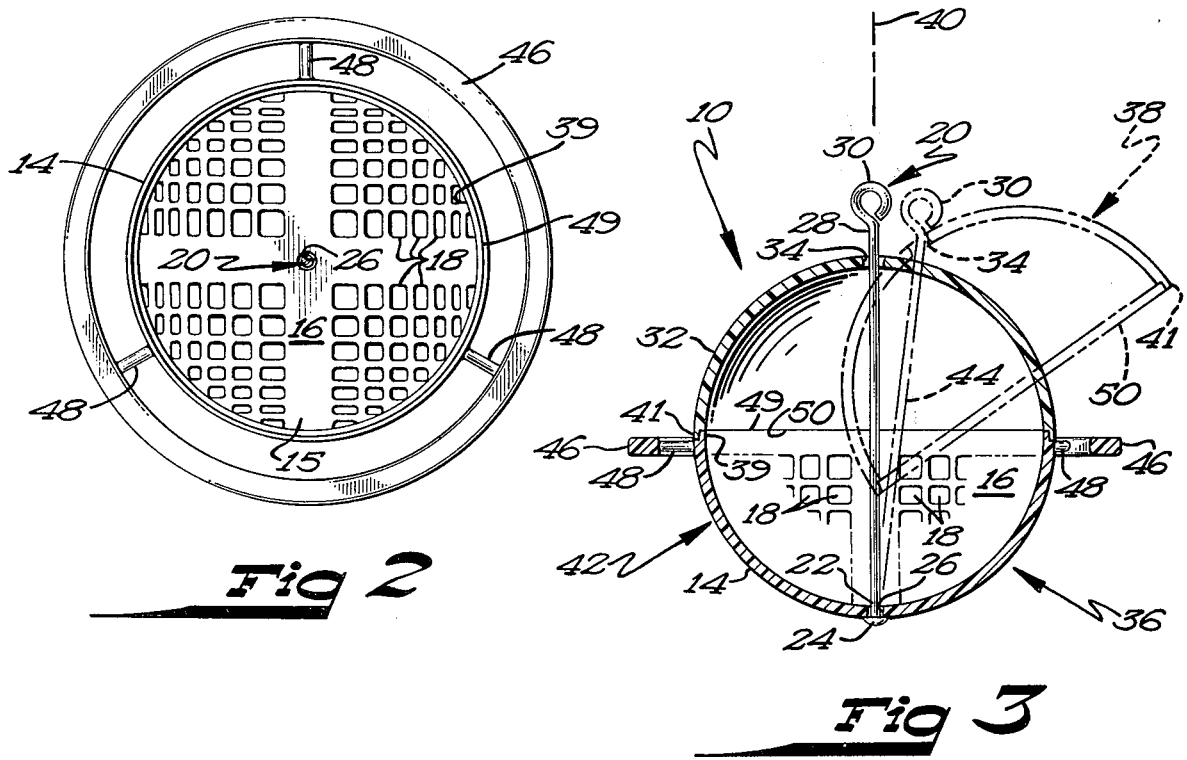
Fig 2
Fig 3

BIRD FEEDING STATION

BACKGROUND AND SUMMARY OF THE INVENTION

The invention relates to the field of bird feeding stations and is particularly well adapted for dispensing of suet to birds while simultaneously being highly resistant to the elements yet easy to refill and care for. Its design inherently encourages acrobatic activity on the part of the bird and accordingly observation of the station is highly entertaining to bird watchers.

During cold winter weather small birds often have great difficulty in finding the food material they need for survival; the high energy content of suet makes it a highly desirable food for such birds.

The feeding station utilizes an open-top bowl with a chamber therein for containment of food and has a cover for closing the open top of the bowl, the cover and bowl being joinable by mating lips along a line of intersection. It is preferred that the station be spherical in shape and the bowl and cover each be hemispherical in shape and retained along their line of intersection by a set of annular lips on the cover and bowl. An elongated rod extends upwardly from the bowl, the lower end of the rod supporting and carrying the bowl and the upper end of the rod being hung from a support such as a tree or pole. The elongated rod extends upwardly from the bowl, preferably lying along the polar axis of the spherical body when the station is spherical in shape. The elongated member passes through an aperture at the pole of the cover, the aperture being larger than the diameter of the rod to permit sliding movement of the cover along the rod toward and away from the bowl, while also permitting tilting of the cover relative to the rod to thereby separate cover and bowl and enlarge the opening between them to facilitate insertion of food. Preferably the lower end of the rod is loosely retained by the bowl to permit the rod to be pivoted relative to the bowl to further increase the opening between the cover and bowl. A perch ring is fixed to the station and encircles it. The bowl has a plurality of perforations therethrough for dispensing of suet, permitting a bird hanging from the perch ring to extract the suet through the perforations.

The feeding station may be formed of lightweight plasticlike material and be of relatively small diameter such that when the station is hung from a support and used by a bird, the station will swing readily in response to bird movement and encourage a series of acrobatic movements by the bird in order to extract suet from the station.

The invention is sturdy, exceptionally reliable, long lasting and highly resistant to all types of weather. The preferred spherical outer shape of the station assures a large inner chamber for storage of food materials, and the unperforated upper hemisphere provides a precipitation shield to protect the contents of the station during inclement weather. The invention is economical to manufacture and provides a bird feeding station of substantial benefit to wildlife while also affording a source of many joyful hours of entertainment to bird watchers. These and other advantages of the invention will be apparent from the following detailed description and from the appended drawings.

BRIEF DESCRIPTION OF THE DRAWING

FIG. 1 is a perspective view of an embodiment of the bird feeding station.

FIG. 2 is a cross-sectional, top elevation view of the embodiment of FIG. 1, taken along the cutting plane 2—2 of FIG. 1.

FIG. 3 is a cross-sectional side elevation view of the embodiment of FIG. 1, taken in the direction of cutting plane 3—3 and being partly in phantom to show alternative positions of the components of the station.

DESCRIPTION OF THE PREFERRED EMBODIMENT

Referring now to FIGS. 1-3 of the drawing, a bird feeding station 10 embodying the invention is shown hanging from a support such as tree 12. The station 10 has a bowl 14 with an open top 15, the bowl having an interior chamber 16 in which a supply of food may be contained until fully dispensed through the plurality of perforations 18 spaced about the bowl 14. An elongated, generally straight rod 20 has a lower end 22 constructed to carry the bowl 14, it being preferred that the end 22 be provided with an enlarged head 24 or the like which is greater in diameter than the bore 26 in bowl 14 through which the rod 20 extends. Accordingly the bowl 14 rests upon the head 24 and is carried by the rod 20.

The upper end 28 of the rod 20 has an eyelet 30 or may alternatively have a hook in place of the eyelet, either of which comprises a stop to limit upward movement of the cover, as will be described hereafter, and also serves as a means for attaching the station 10 to a support.

A cover 32 fits over the open top 15 of bowl 14 and is unperforated aside from the rod aperture 34 so as to provide a cover to prevent the entry of most precipitation into the chamber 16. The rod 20 extends through the aperture 34 of the cover 32, and the cover is slideably mounted and movable along the rod 20 to move between a closed position 36 shown in FIGS. 1 and 3 wherein the cover engages and closes the open top 15 of the bowl, and a loading position 38 wherein the cover is spaced along the rod from the bowl and toward the stop 30 to space the bowl and cover apart while inserting food within the chamber 16. The rod 20 has a length greater than the diameter of the spherical body 42 so that the cover and bowl can be separated by sliding the cover along rod 20 until it is clear of the bowl 14.

The aperture 34 in cover 32 has a greater diameter than the diameter of the rod 20 in order to permit tilting of the cover relative to the rod 20, as best shown in FIG. 3, thereby facilitating the insertion of food between the rims 49 and 50 of bowl and cover, respectively.

Preferably, the cover and bowl have the shape of spherical segments, the segments having the same radius of curvature so that the cover and bowl cooperate to define a generally spherical body 42 when the cover is in the closed position 36. It is preferred that the line of separation between the cover and bowl members be an equator of the spherical body 42 and that both cover and bowl preferably be hemispherical in shape.

The bowl 14 is provided with an annular upwardly extending lip 39 about its rim 49 and adapted to matably receive the downwardly extending annular lip 41 about the rim 50 of cover 32, the lips cooperating with each other and with the elongated rod 20 to retain the cover on the bowl when the cover is in closed position 36.

The rod 20 is preferably loosely mounted in bore 26 of the bowl 14 to permit precessional movement of the rod 20 about the polar axis 40 of bowl 14, thereby permitting the rod to be tilted outwardly from the polar axis 40 to tilted position 44 to increase the distance of separation between the rims 49 and 50 to facilitate insertion of food when the cover is in loading position 38.

It is preferred that the rod 20 enter the bowl or be attached thereto at the pole thereof and also pass through the cover at its pole as shown in the drawings, the rod 20 thus lying along the polar axis 40 of the spherical body 42 when the cover is in closed position 36.

A perch ring 46 is annular in shape, encircles the spherical body 42 and is fixed thereto by radially extending struts 48 which have their inner ends anchored to the bowl 14 and their outer ends rigidly joined to the ring 46.

It is preferred that the spherical body 42 be formed of a thin, light, relatively strong, plastic-like material, and while the feeding station may be of any appropriate size, a station having an outer diameter of approximately five inches has been found particularly effective for small birds such as chickadees, nuthatches and the smaller woodpeckers.

When the spherical body 42 has a weight which is of the same order of magnitude as that of the bird, the station 10 will swing readily as a bird perches on the ring 46, thereby inducing the bird to move acrobatically with the station and cling in an inverted position 55 while extracting suet through the perforations 18, such acrobatics greatly adding to the interest of bird watchers observing the feeding station.

In operation, the feeding station 10 is hung from an appropriate pole or tree 12 and when the operator loads it with a supply of suet, he slides the cover 32 upwardly along rod 20 until the hole 34 of the cover contacts the eyelet or stop 30; he then tilts the cover 32 about the rod 20 to the angled loading position 38. In addition, the rod 20 may be tilted or precessed about the polar axis 40 of the body 42 because it is loosely mounted to the bowl 14; such tilting provides additional clearance between cover and bowl to further facilitate the insertion of food within chamber 16. When the chamber 16 has been filled, the operator lowers the cover 32 along the rod 20 and matably engages the downwardly directed lips 41 about the upwardly directed lips 39 to snugly engage the hemispheres. In this closed position 36 the rod 20 and the lips 39 and 41 cooperate to keep the cover 32 securely in place on the bowl 14 and even strong wind will not readily dislodge the cover. Birds attracted to the feeding station alight on the annular perch ring 46, hanging in an upside-down position 55 while extracting suet from the perforations 18. During the warmer months when suet is not especially needed by the birds, the station may be filled with bread or the like.

While the preferred embodiment of the present invention has been described, it should be understood that various changes, adaptations and modifications may be made therein without departing from the spirit of the invention and the scope of the appended claims.

What is claimed is:

1. A bird feeding station for dispensing suet to birds, hangable from a support, and entertaining to bird watchers, comprising:
   an open-top bowl with a chamber therein for containment of suet, said bowl having a plurality of perforations therein and through which suet may be extracted by birds;
   an elongated rod with upper and lower ends, said lower end of said rod passing through said chamber and carrying said bowl and said rod having a stop adjacent the upper end for attachment to the support;
   a cover for closing said open top of said bowl and having an aperture therethrough, with said rod passing through said aperture such that said cover is slidably mounted on said rod to move between a closed position wherein said cover engages and closes the open top of said bowl, and a loading position wherein said cover is spaced from said bowl along said rod and toward said stop to space said bowl and cover from one another;
   said aperture of said cover being greater in diameter than the diameter of said elongated rod, permitting free rotational movement of said cover about said rod and also permitting tilting of said cover relative to said elongated rod when in a loading position to facilitate insertion of suet between said bowl and said cover; and
   said lower end of said rod being loosely retained by said bowl to permit free rotational movement of said bowl about said rod, thereby permitting said bowl and said cover, when in closed position, to rotate together freely about said rod in response to movement of birds during their arrival at and use of the feeding station to thereby encourage bird acrobatics entertaining to bird watchers.

2. The bird feeding station of claim 1 whrein said cover and said open top of said bowl are provided with mating lips, said lips cooperating with each other and with said elongated rod to retain said cover on said bowl when said cover is in closed position to encourage said cover and said bowl to rotate together freely about said rod.

3. The bird feeding station of claim 2 wherein said bowl and said cover are each hemispherical in shape to define a spherical body when in closed position, and said elongated rod lies substantially on the polar axis of said spherical body and passes from pole to pole of said spherical body, with said chamber of said body being otherwise clear for the storage of suet and the free dropping of suet into communication with said perforations.

4. The bird feeding station of claim 3 and further including a perch ring encircling said spherical body, attached to said spherical body to provide a resting place for birds during feeding and positioned substantially midway between upper and lower poles of said spherical body.

* * * * *